US010149101B2

(12) United States Patent
Yang

(10) Patent No.: US 10,149,101 B2
(45) Date of Patent: Dec. 4, 2018

(54) ELECTRONIC DEVICE AND REMINDER METHOD

(71) Applicant: Chiun Mai Communication Systems, Inc., New Taipei (TW)

(72) Inventor: Cheng-Kuo Yang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/437,523

(22) Filed: Feb. 21, 2017

(65) Prior Publication Data
US 2017/0353834 A1 Dec. 7, 2017

(30) Foreign Application Priority Data

Jun. 2, 2016 (CN) .......................... 2016 1 0388288

(51) Int. Cl.
*H04W 24/00* (2009.01)
*H04W 4/02* (2018.01)
*H04W 4/20* (2018.01)
*G06K 9/62* (2006.01)
*G06K 9/00* (2006.01)

(52) U.S. Cl.
CPC ........ *H04W 4/023* (2013.01); *G06K 9/00369* (2013.01); *G06K 9/6202* (2013.01); *H04W 4/20* (2013.01)

(58) Field of Classification Search
CPC .......... G01S 7/003; G01S 13/87; G01S 17/08; G01S 15/08; H04W 4/021; H04W 4/22; G08G 1/096805; G06T 15/205; G06K 9/00805
USPC ................................. 455/414.3; 348/62; 1/1
See application file for complete search history.

(56) References Cited

U.S. PATENT DOCUMENTS

2013/0250078 A1* 9/2013 Levy .......................... A61F 9/08
348/62
2017/0102451 A1* 4/2017 O'Leary ................. G01S 7/003

FOREIGN PATENT DOCUMENTS

TW 201610935 A 3/2016

* cited by examiner

*Primary Examiner* — Phuoc H Doan
(74) *Attorney, Agent, or Firm* — ScienBiziP, P.C.

(57) ABSTRACT

A method for reminding a user to take a weather-related object with him or her when going outside, applied to an electronic device, includes obtaining weather information at the present time or for one or more predetermined future time points or periods. A reminder is given to the user according to the obtained weather information, wherein the reminder includes a weather-related object relevant to the obtained weather information.

18 Claims, 5 Drawing Sheets

ELECTRONIC DEVICE AND REMINDER METHOD

CROSS-REFERENCE TO RELATED APPLICATIONS

This application claims priority to Chinese Patent Application No. 201610388288.3 filed on Jun. 2, 2016, the contents of which are incorporated by reference herein.

FIELD

The subject matter herein generally relates to managing technology, and particularly to an electronic device and a reminder method.

BACKGROUND

Generally, people do not take an umbrella if the weather is just cloudy while he or she plans to go outdoors. Such people may get wet if the weather changes, e.g. suddenly rain, after they had already stepped outdoors.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
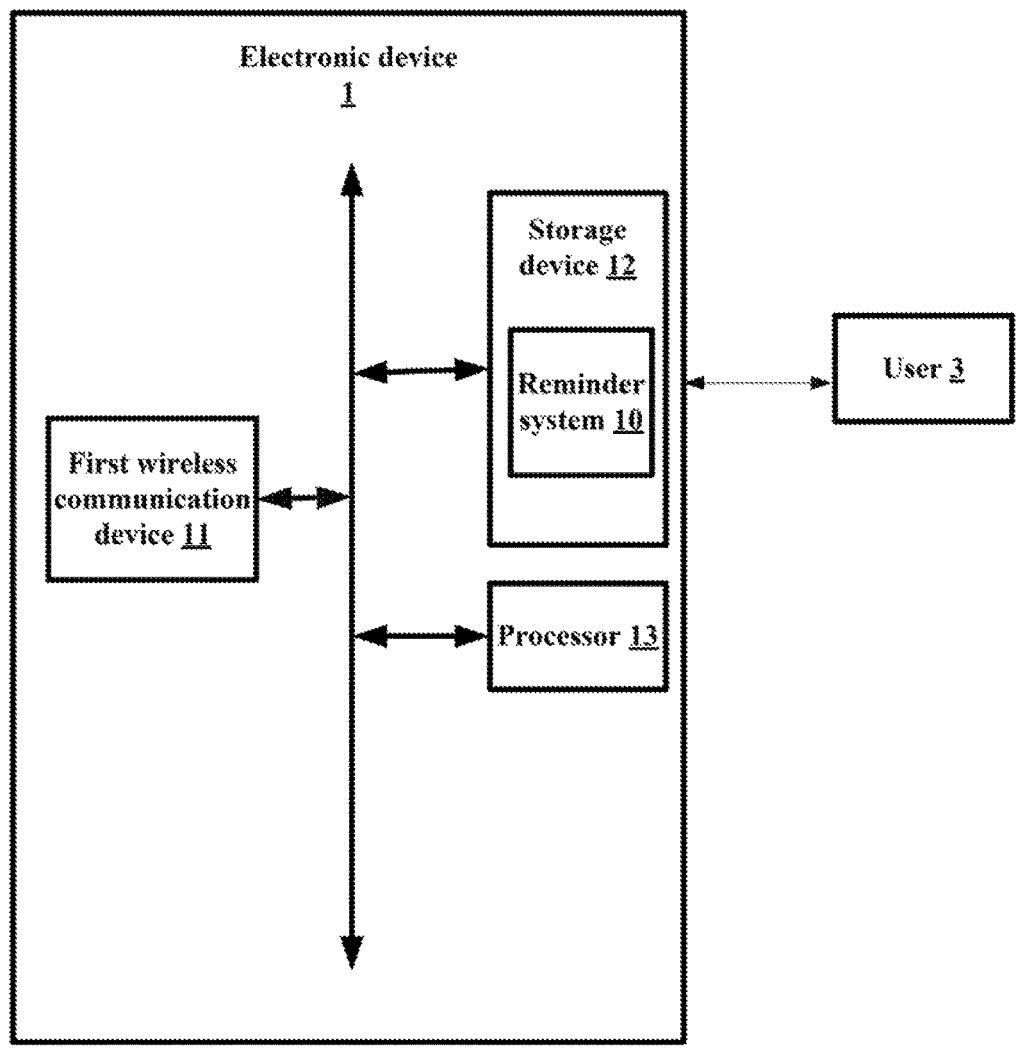
FIG. 1 is a block diagram of an exemplary embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" exemplary embodiment in this disclosure are not necessarily to the same exemplary embodiment, and such references mean "at least one."

Furthermore, the term "module", as used herein, refers to logic embodied in hardware or firmware, or to a collection of software instructions, written in a programming language, such as, JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of an exemplary embodiment of an electronic device. Depending on the exemplary embodiment, an electronic device 1 can include a reminder system 10. The reminder system 10 can automatically remind a user 3 of the electronic device to bring a weather-related object according to weather information. For example, when the weather is rainy, the reminder system 10 can remind the user 3 to take rain gear such as an umbrella. The electronic device 1 can further include, but is not limited to, a first wireless communication device 11, a storage device 12, and at least one processor 13. In at least one exemplary embodiment, the electronic device 1 can be a mobile phone, a tablet computer, a personal digital assistant (PDA), or any other suitable device such as a wearable device.

In at least one exemplary embodiment, when the user 3 is going out, the reminder system 10 can transmit a reminder relevant to the weather information. In at least one exemplary embodiment, the reminder system 10 can determine whether the user 3 is in a process of going out using communication signals between the first wireless communication device 11 and other wireless communication devices. In at least one exemplary embodiment, the reminder system 10 can determine whether the user 3 is going out according to a signal intensity of the communication signal.

Figure 2:
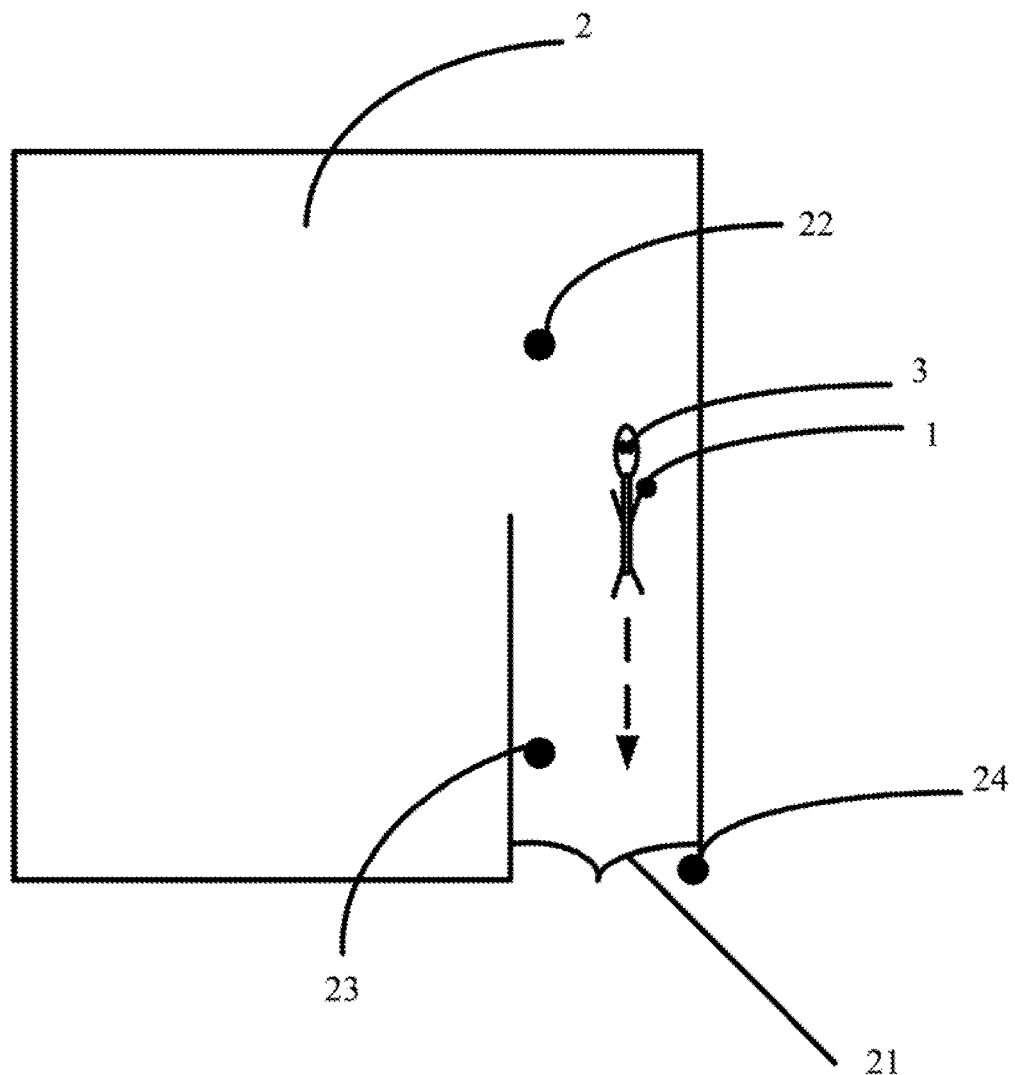
FIG. 2 illustrates an exemplary example of installation of wireless communication devices in an area.

Referring to FIG. 2, in at least one exemplary embodiment, two or more wireless communication devices such as a second wireless communication device 22 and a third wireless communication device 23 can be installed in or around a house 2. In at least one exemplary embodiment, installation positions for the two or more wireless communication devices can be positions located inside the house 2 and having different distances from a gate 21 of the house 2. In other exemplary embodiments, the installation positions can include a first position located inside the gate 21 and a second position located outside the gate 21. In at least one exemplary embodiment, the house 2 can be a home of the user 3, or any other location such as an office. The reminder system 10 can determine whether the user 3 is the house 2 according to first changes in distance between the first wireless communication device 11 and the second wireless communication device 22, and second changes in distance between the first wireless communication device 11 and the third wireless communication device 23. In at least one exemplary embodiment, the reminder system 10 can determine the first changes in distance according to changes in the signal intensity of first communication signals between the first wireless communication device 11 and the second wireless communication device 22. The reminder system 10 can similarly determine the second changes in distance according to changes in the signal intensity of second communication signals between the first wireless communication device 11 and the third wireless communication device 23. It should be noted that the first changes in distance can also be treated as changes in distance between the electronic device 1 and the second wireless communication device 22. Similarly, the second changes in distance can be treated as changes in distance between the electronic device 1 and the third wireless communication device 23.

For example, when the user 3 is carrying the electronic device 1 and is going out, because the electronic device 1 is moving farther and farther away from the second wireless communication device 22, the signal intensity of the first communication signal received by the first wireless communication device 11 from the second wireless communication device 22 gradually decreases. At the same time, because the electronic device 1 is moving closer and closer to the third communication device 23, the signal intensity of the second communication signal received by the first wireless communication device 11 from the third wireless communication device 23 gradually increases. After the user 3 passes by the third communication device 23, the signal intensity of the second communication signal received by the first wireless communication device 11 from the third wireless communication device 23 reaches a max signal intensity, the signal intensity of the second communication signal received by the first wireless communication device 11 from the third wireless communication device 23 gradually decreases as the electronic device 1 moves farther and farther away from the third communication device 23. That is, the reminder system 10 can determine whether the user 3 is going out according the signal intensity of the first communication signal received by the first wireless communication device 11 from the second wireless communication device 22 and the signal intensity of the second communication signal received by the first wireless communication device 11 from the third wireless communication device 23.

For another example, it is assumed that the electronic device 1 is initially located near the second wireless communication device 22. When the user 3 takes the electronic device 1 and is going out, the distance value between the first wireless communication device 11 and the second wireless communication device 22 gradually increases, thus, the signal intensity of the first communication signal received by the first wireless communication device 11 from the second wireless communication device 22 gradually decreases. Then the reminder system 10 can determine whether the user 3 is going out according the signal intensity of the first communication signal.

In at least one exemplary embodiment, the first wireless communication device 11, the second wireless communication device 22, and the third wireless communication device 23 can be beacon transmitting devices.

In other exemplary embodiments, the first wireless communication device 11, the second wireless communication device 22, and the third wireless communication device 23 can be WIFI devices or other kinds of communication devices such as BLUETOOTH or ZIGBEE devices.

In at least one exemplary embodiment, the reminder system 10 can calculate a first distance value between the first wireless communication device 11 and the second wireless communication device 22 according to a signal intensity of a communication signal that is received by the first wireless communication device 11 from the second wireless communication device 22. The reminder system 10 can calculate a second distance value between the first wireless communication device 11 and the third wireless communication device 23 according to a signal intensity of a communication signal received by the first wireless communication device 11 from the third wireless communication device 23.

In other exemplary embodiments, a camera 24 can be installed outside the gate 21 and can be used to capture images of the user 3. The reminder system 10 can determine whether the user is going out according to the captured images. For example, when a predetermined number of continuously captured images are determined to be images of the back of the user 3, the reminder system 10 can determine that the user is going out. In at least one exemplary embodiment, the reminder system 10 can compare each of the captured images with a pre-stored image template to determine whether the captured images show the back of the user 3. When the predetermined number of continuously captured images match the pre-stored image template, the reminder system 10 can determine that the user is going out. In at least one exemplary embodiment, the pre-stored image template is an image of the back of the user 3. The predetermined number can be three or more. In at least one exemplary embodiment, the camera 24 can be a wireless camera that can be wirelessly connected with the electronic device 1.

In at least one exemplary embodiment, the reminder system 10 can further determine whether the user 3 has taken the weather-related object relevant to the weather information (hereinafter "related object").

In at least one exemplary embodiment, the related object may be, but are not limited to rain gear or sun glasses. In at least one exemplary embodiment, each related object is installed with a wireless communication device such as the Beacon transmitting device. The reminder system 10 can calculate a distance value between the electronic device 1 and each related object using a signal intensity of a communication signal between the first wireless communication device 11 and the wireless communication device installed on each related object. For example, the reminder system 10 can determine that the user 3 takes the rain gear when the distance value between the electronic device 1 and the rain gear is less than a predetermined value such as 0.3 meter.

The storage device 12 can be used to store all kinds of data such as codes of program instructions of the reminder system 10. In at least one exemplary embodiment, the storage device 12 can be an internal storage device such as a memory of the electronic device 1. In other exemplary embodiments, the storage device 12 can be external storage device of the electronic device 1. For example, the storage device 12 can be a secure digital card, a smart media card, or a flash card.

Figure 3:
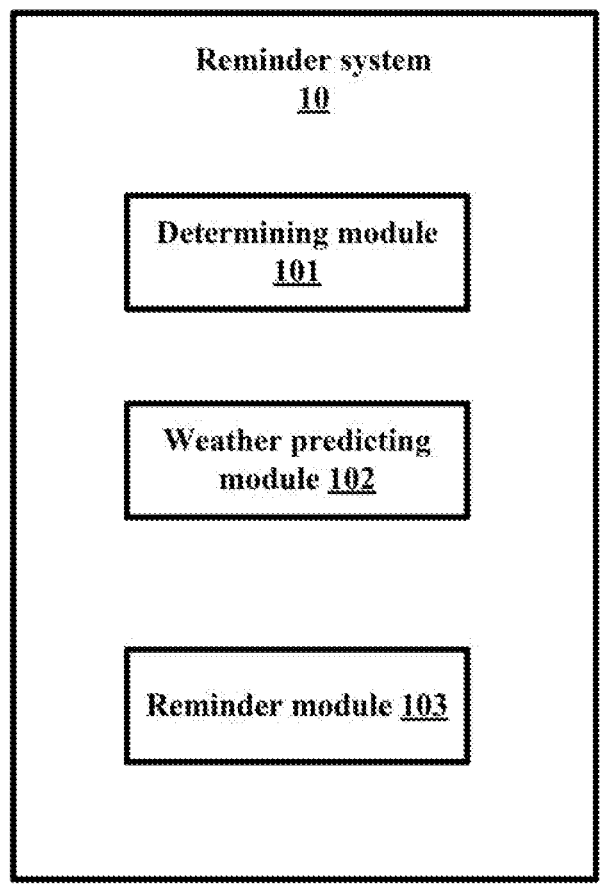
FIG. 3 is a block diagram of an exemplary embodiment of modules of a reminder system included in the electronic device of FIG. 1.

FIG. 3 is a block diagram of an exemplary embodiment of modules of the reminder system 10. In at least one exemplary embodiment, the reminder system 10 can include a determining module 101, a weather predicting module 102, and a reminder module 103. The modules 101-103 include computer instructions or codes in the form of one or more programs that may be executed by the at least one processor 13.

The determining module 101 can determine whether the user 3 is going out.

In at least one exemplary embodiment, the determining module 101 can determine whether the user 3 is going out according to the first changes in distance between the first wireless communication device 11 and the second wireless communication device 22, and second changes in distance between the first wireless communication device 11 and the third wireless communication device 23. In at least one exemplary embodiment, the determining module 101 can determine the first changes in distance according to changes in the signal intensity of the first communication signals between the first wireless communication device 11 and the second wireless communication device 22. The determining module 101 can determine the second changes in distance according to changes in the signal intensity of the second communication signals between the first wireless communication device 11 and the third wireless communication device 23.

In at least one exemplary embodiment, when a first distance value between the first wireless communication device 11 and the second wireless communication device 22 gradually increases and the second distance value between the first wireless communication device 11 and the third wireless communication device 23 gradually decreases at the same time, and after the first distance value becomes greater than a preset distance value, the second distance value gradually becomes greater, the determining module 101 can determine the user 3 is going out. In at least one exemplary embodiment, the preset distance value can be a distance value between the second wireless communication device 22 and the third wireless communication device 23.

In other exemplary embodiments, when the signal intensity of the first communication signal received by the first wireless communication device 11 from the second wireless communication device 22 gradually decreases, the signal intensity of the second communication signal received by the first wireless communication device 11 from the third wireless communication device 23 gradually increases at the same time, and after the signal intensity of the second communication signal reaches a max signal intensity as the user 3 bringing the electronic device 1 passes by the third wireless communication device 23, the signal intensity of the second communication signal gradually decreases because the user 3 is gradually leaving away from the third communication device 23, the determining module 101 can determine the user 3 is going out.

The weather predicting module 102 can obtain weather information for a predetermined period of time in the future when the user 3 is determined to be going out. In at least one exemplary embodiment, the predetermined period of time in the future can be next three hours, next five hours, or other periods of time. In at least one exemplary embodiment, the predetermined period of time in the future can be set by the user 3. In at least one exemplary embodiment, the weather predicting module 102 can obtain the weather information from the internet, or any predetermined weather predicting and reporting software.

In at least one exemplary embodiment, the weather predicting module 101 can obtain the weather information of the predetermined period of time in the future at predetermined time points. In at least one exemplary embodiment, the predetermined time points can include, but are not limited to, wake up time of the user 3, the time the user 3 leaves work, or other predetermined time points.

The determining module 101 can determine whether the user 3 takes the related object relevant to the obtained weather information.

For example, when the obtained weather information indicates that it may rain in the next three hours, the determining module 101 can determine whether the user 3 takes the rain gear. For another example, when the obtained weather information indicates that an outdoor temperature value may becomes greater than a predetermined temperature value, the determining module 101 can determine whether the user 3 takes a pair of sun glasses.

In at least one exemplary embodiment, the determining module 101 can determine whether the user 3 takes the related object according to the signal intensity of the communication signal between the first wireless communication device 11 and the wireless communication device installed on the related object. For example, when the signal intensity of the communication signal received by the first wireless communication device 11 from the wireless communication device installed on the rain gear is greater than a preset signal intensity value, the determining module 101 can determine the user 3 takes the rain gear.

In at least one exemplary embodiment, the determining module 101 can determine whether the user 3 takes the corresponding related object according to a distance value between the first wireless communication device 11 and the wireless communication device installed on the related object. For example, when the distance value is less than a preset value such as 0.3 meter, the determining module 101 can determine that the user 3 has taken the corresponding related object.

The reminder module 103 can transmit a reminder when the user 3 does not take the related object.

For example, if the user 3 does not take the rain gear when the obtained weather information indicates that rain will fall in the next three hours, the reminder module 103 can remind the user to take the rain gear by a predetermined method. For example, the reminder module 103 can display on a screen of the electronic device 1 a message that reminds the user 3 to take the rain gear, or can control the electronic device 1 to play a voice message advising the user to take the rain gear.

In other exemplary embodiments, the predetermined period of time in the future can include two different preset time points. The reminder module 103 can remind the user to take the relevant related object according to a result of comparing weather information at two different preset time points. For example, the two different preset time points includes a first time point of the user 3 going to work, and a second time point of the user 3 leaving work. If the obtained weather information indicates cloudy weather at the first time point, and raining occurs at the second time point, this is shown by the comparison between the two different preset time points. Accordingly, the determining module 101 can determine different related object relevant to the different weather. Then the reminder module 103 can remind the user to take different related object. For example, if the determining module 101 determines that the user 3 does not take the sun glasses, the reminder module 103 not only reminds the user 3 to take the sun glasses, but also can reminds the user 3 to take the rain gear.

Figure 4:
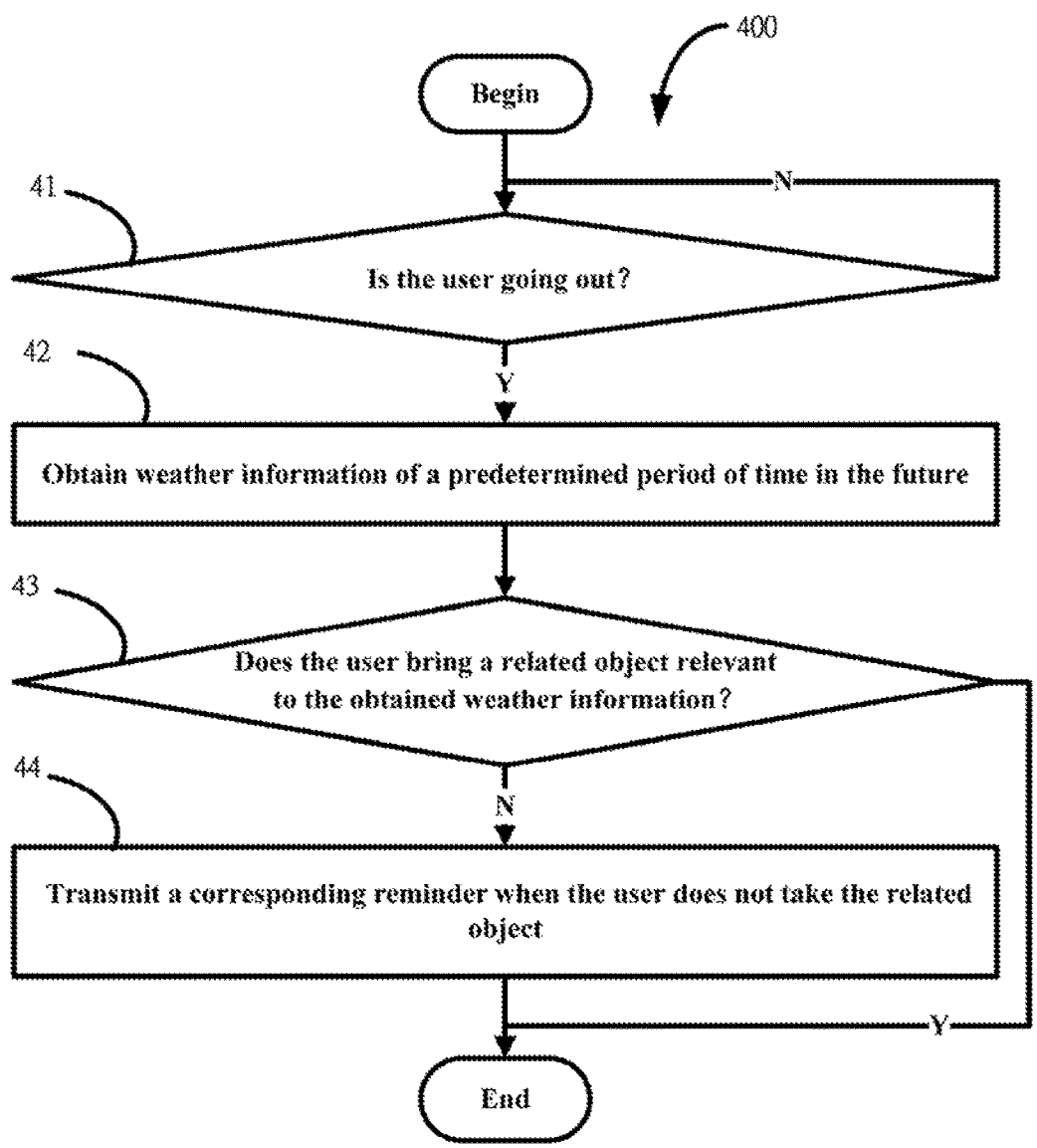
FIG. 4 is a flowchart of an exemplary embodiment of a first reminder method.

FIG. 4 illustrates an exemplary embodiment of a flowchart of a first reminder method. The example method 400 is provided by way of example, as there are a variety of ways to carry out the method. The method 400 described below can be carried out using the configurations illustrated in FIG. 1, for example, and various elements of these figures are referenced in explaining example method 400. Each block shown in FIG. 4 represents one or more processes, methods, or subroutines, carried out in the example method 400. Additionally, the illustrated order of blocks is by example only and the order of the blocks can be changed according to the present disclosure. The example method 400 can begin at block 41. Depending on the exemplary embodiment, additional steps can be added, others removed, and the ordering of the steps can be changed.

At block 41, the determining module 101 can determine whether the user 3 is going out. When the user 3 is determined to be going out, the process goes to block 42.

In at least one exemplary embodiment, the determining module 101 can determine whether the user 3 is going out according to the first changes in distance between the first wireless communication device 11 and the second wireless communication device 22, and the second changes in distance between the first wireless communication device 11 and the third wireless communication device 23.

In at least one exemplary embodiment, the determining module 101 can determine the first changes in distance according to changes in the signal intensity of the first communication signals between the first wireless communication device 11 and the second wireless communication device 22. The determining module 101 can determine the second changes in distance according to changes in the signal intensity of the second communication signals between the first wireless communication device 11 and the third wireless communication device 23.

In at least one exemplary embodiment, when a first distance value between the first wireless communication device 11 and the second wireless communication device 22 gradually increases and the second distance value between the first wireless communication device 11 and the third wireless communication device 23 gradually decreases at the same time, and after the first distance value becomes greater than a preset distance value, the second distance value gradually increases, the determining module 101 can determine the user 3 is going out. In at least one exemplary embodiment, the preset distance value can be a distance value between the second wireless communication device 22 and the third wireless communication device 23.

In other exemplary embodiments, when the signal intensity of the first communication signal received by the first wireless communication device 11 from the second wireless communication device 22 gradually decreases, the signal intensity of the second communication signal received by the first wireless communication device 11 from the third wireless communication device 23 gradually increases at the same time, and after the signal intensity of the second communication signal reaches the max signal intensity as the user 3 bringing the electronic device 1 passes by the third wireless communication device 23, the signal intensity of the second communication signal gradually decreases because the user 3 is gradually moving away from the third communication device 23, and then the determining module 101 can determine the user 3 is going out.

At block 42, the weather predicting module 102 can obtain weather information for a predetermined period of time in the future when the user 3 is determined to be going out. In at least one exemplary embodiment, the predetermined period of time in the future can be next three hours, next five hours, or other period. In at least one exemplary embodiment, the predetermined period of time in the future can be set by the user 3. In at least one exemplary embodiment, the weather predicting module 102 can obtain the weather information from the internet, or any predetermined weather predicting and reporting software.

In at least one exemplary embodiment, the weather predicting module 101 can obtain the weather information of the predetermined period of time in the future at predetermined time points. In at least one exemplary embodiment, the predetermined time points can include, but are not limited to, waking up time of the user 3, the time the user 3 leaves work, or other predetermined time point.

At block 43, the determining module 101 can determine whether the user 3 takes the related object relevant to the obtained weather information. When the user 3 takes the related object relevant to the obtained weather information, the process is ended. When the user 3 does not take the related object relevant to the obtained weather information, the process goes to block 44.

For one example, when the obtained weather information indicates that it may rain in the next three hours, the determining module 101 can determine whether the user 3 takes the rain gear. For another example, when the obtained weather information indicates that an outdoor temperature value may become greater than a predetermined temperature value, the determining module 101 can determine whether the user 3 takes a pair of sun glasses.

In at least one exemplary embodiment, the determining module 101 can determine whether the user 3 takes the corresponding related object according to the signal intensity of the communication signal between the first wireless communication device 11 and the wireless communication device installed on the related object. For example, when the signal intensity of the communication signal received by the first wireless communication device 11 from the wireless communication device installed on the rain gear is greater than a preset signal intensity value, the determining module 101 can determine the user 3 has taken the rain gear.

In at least one exemplary embodiment, the determining module 101 can determine whether the user 3 takes the corresponding related object according to a distance value between the first wireless communication device 11 and the wireless communication device installed on the related object. For example, when the distance value is less than a preset value such as 0.3 meter, the determining module 101 can determine that the user 3 takes the corresponding related object.

At block 44, the reminder module 103 can transmit a reminder to the user 3 when the user 3 does not take the related object.

For example, if the user 3 does not take the rain gear when the obtained weather information indicates that rain will occur in the next three hours, the reminder module 103 can remind the user to take the rain gear by a predetermined method. For example, the reminder module 103 can display on a screen of the electronic device 1 a message that reminds the user 3 to take the rain gear, or can control the electronic device 1 to play a voice message advising the user to take the rain gear.

In other exemplary embodiments, the predetermined period of time in the future can include two different preset time points. The reminder module 103 can remind the user to take the relevant related object according to a result of comparing weather information at two different preset time points. For example, the two different preset time points includes a first time point of the user 3 going to work, and a second time point of the user 3 leaving work. If the obtained weather information indicates cloudy weather at the first time point, and rain at the second time point, this is shown by the comparison between the two different preset time points. Accordingly, the determining module 101 can determine different related object relevant to the different weather. Then the reminder module 103 can remind the user to take the different related object. For example, if the determining module 101 determines that the user 3 does not take the sun glasses, the reminder module 103 can not only remind the user 3 to take the pair of sun glasses, but also can remind the user 3 to take the rain gear.

Figure 5:
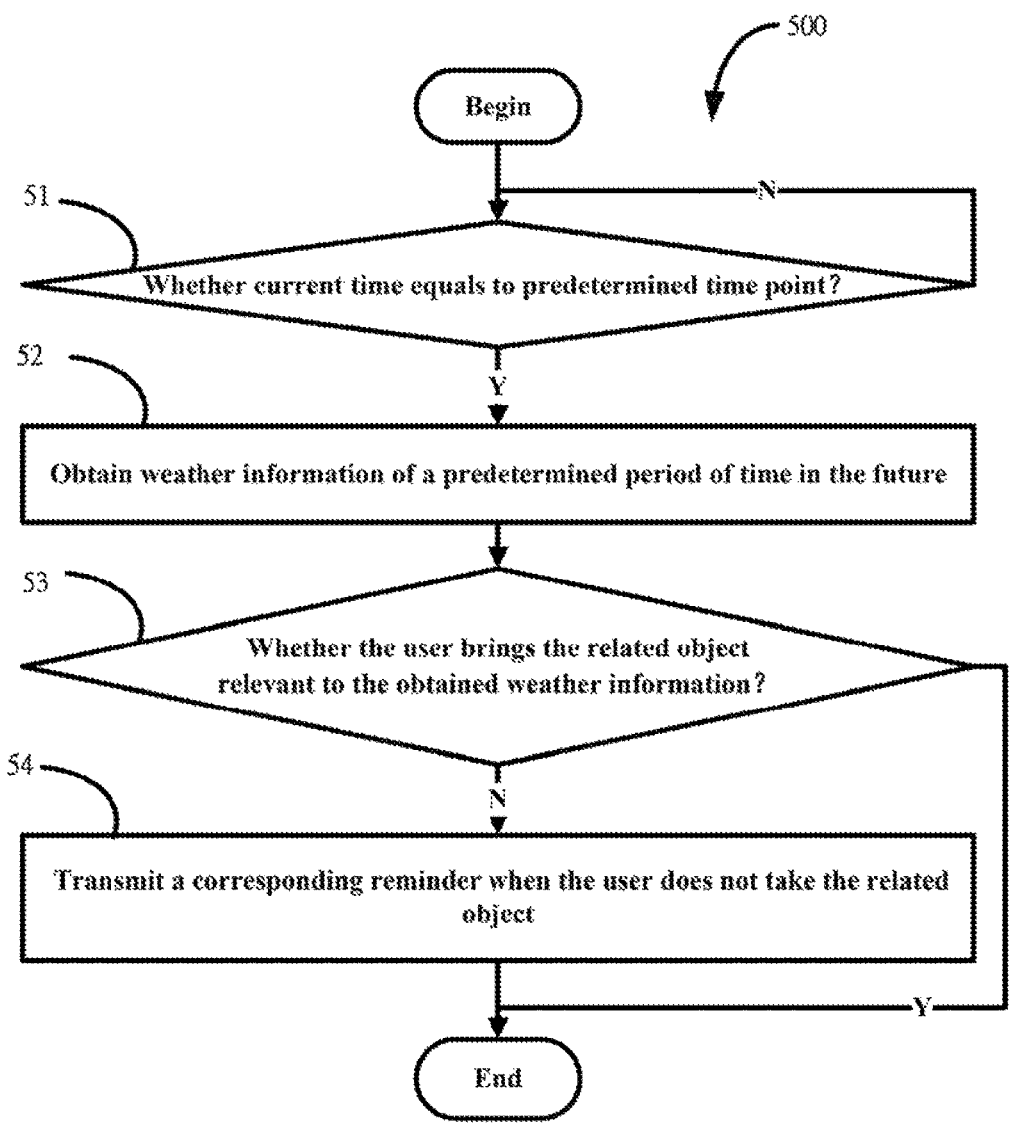
FIG. 5 is a flowchart of an exemplary embodiment of a second reminder method.

FIG. 5 illustrates an exemplary embodiment of a flowchart of a second reminder method. The example method 500 is provided by way of example, as there are a variety of ways to carry out the method. The method 500 described below can be carried out using the configurations illustrated in FIG. 1, for example, and various elements of these figures are referenced in explaining example method 500. Each block shown in FIG. 5 represents one or more processes, methods, or subroutines, carried out in the example method 500. Additionally, the illustrated order of blocks is by example only and the order of the blocks can be changed according to the present disclosure. The example method 500 can begin at block 51. Depending on the exemplary embodiment, additional steps can be added, others removed, and the ordering of the steps can be changed.

At block 51, the determining module 101 can determine whether current time equals to one or the predetermined time points. When the current time equals to one of the predetermined time points, the process goes to block 52. In at least one exemplary embodiment, the predetermined time points can include, but are not limited to, waking up time of the user 3, the time the user 3 leaves work, or other predetermined time point.

At block 52, the weather predicting module 102 can obtain weather information of a predetermined period of time in the future. For example, the weather predicting module 102 can obtain the weather information of the next three hours.

At block 53, the determining module 101 can determine whether the user 3 takes the related object relevant to the obtained weather information. When the user 3 takes the related object relevant to the obtained weather information, the process is ended. When the user 3 does not take the related object relevant to the obtained weather information, the process goes to block 54.

In at least one exemplary embodiment, when the signal intensity of the first communication signal received by the first wireless communication device 11 from the second wireless communication device 22 gradually decreases, the signal intensity of the second communication signal received by the first wireless communication device 11 from the third wireless communication device 23 gradually increases at the same time, and after the signal intensity of the second communication signal reaches a max signal intensity, the signal intensity of the second communication signal gradually decreases, then the determining module 101 can determine whether the user 3 takes the related object relevant to the obtained weather information.

At block 54, the reminder module 103 can transmit a reminder when the user 3 does not take the related object.

For example, if the user 3 does not take the rain gear when the obtained weather information indicates rain in the next three hours, the reminder module 103 can remind the user to take the rain gear by a predetermined method. For example, the reminder module 103 can display on a screen of the electronic device 1 a message that reminds the user 3 to take the rain gear, or can control the electronic device 1 to play a voice message advising the user to take the rain gear.

It should be noted that, in other exemplary embodiments, the reminder module 103 can directly transmit the reminder when the weather predicting module 102 obtains the weather information. In other words, after the block 52 is executed, the process can directly goes to block 54.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. An electronic device, comprising:
   a first wireless communication device;
   a storage device; and
   at least one processor, wherein the storage device stores one or more programs, which when executed by the at least one processor, cause the at least one processor to:
   obtain weather information;
   determine a related object relevant to the obtained weather information;
   calculate a distance value between the electronic device and the related object using a signal intensity of a communication signal between the first wireless communication device and a wireless communication device installed on the related object; and
   transmit a reminder when the distance value between the electronic device and the related object is greater than a preset distance value.

2. The electronic device according to claim 1, wherein the at least one processor is further caused to:
   determine the distance value is greater than the preset distance value when the signal intensity of the communication signal is less than a preset signal intensity, wherein the communication signal is received by the first wireless communication device of the electronic device from the wireless communication device installed on the related object.

3. The electronic device according to claim 2, wherein the at least one processor is further caused to:
   determine whether the distance value is greater than the preset distance value after a first condition is met, wherein the first condition comprises:
   a signal intensity of a first communication signal received by the first wireless communication device from a second wireless communication device gradually increasing, and then the signal intensity of the first communication signal reaching a max signal intensity, and then the signal intensity of the first communication signal gradually decreasing.

4. The electronic device according to claim 2, wherein the at least one processor is further caused to:
   determine whether the distance value is greater than the preset distance value after a second condition is met, wherein the second condition comprises:
   each of a predetermined number of continuously captured images matching a predetermined image template.

5. An electronic device, comprising:
   a storage device; and
   at least one processor, wherein the storage device stores one or more programs, which when executed by the at least one processor, cause the at least one processor to:
   obtain weather information at a predetermined time point;
   obtain weather information of two different time points; and
   transmit a reminder according to a result of comparing the weather information at the two different time points, wherein the reminder includes a related object relevant to the obtained weather information.

6. The electronic device according to claim 5, wherein the at least one processor transmits the reminder when a distance value between the electronic device and the related object is greater than a preset distance value.

7. The electronic device according to claim 6, wherein the at least one processor is further caused to:
determine the distance value is greater than the preset distance value when a signal intensity of a communication signal is less than a preset signal intensity, wherein the communication signal is received by a first wireless communication device of the electronic device from a wireless communication device installed on the related object.

8. The electronic device according to claim 7, wherein the at least one processor is further caused to:
determine whether the distance value is greater than the preset distance value after a first condition is meet, wherein the first condition comprises:
a signal intensity of a first communication signal received by the first wireless communication device from a second wireless communication device gradually increasing, and then the signal intensity of the first communication signal reaching a max signal intensity, and then the signal intensity of the first communication signal gradually decreasing.

9. The electronic device according to claim 7, wherein the at least one processor is further caused to:
determine whether the distance value is greater than the preset distance value after a second condition is meet, wherein the second condition comprises:
each of a predetermined number of continuously captured images matching a predetermined image template.

10. A reminder method that is applied to an electronic device, comprising:
obtaining weather information by a processor of the electronic device;
determining, by the processor, a related object relevant to the obtained weather information;
calculating, by the processor, a distance value between the electronic device and the related object using a signal intensity of a communication signal between a first wireless communication device of the electronic device and a wireless communication device installed on the related object; and
transmitting, by the processor, a reminder when the distance value between the electronic device and the related object is greater than a preset distance value.

11. The reminder method according to claim 10, further comprising:
determining the distance value is greater than the preset distance value when the signal intensity of the communication signal is less than a preset signal intensity, wherein the communication signal is received by the first wireless communication device of the electronic device from the wireless communication device installed on the related object.

12. The reminder method according to claim 11, further comprising:
determining whether the distance value is greater than the preset distance value after when a first condition is meet, wherein the first condition comprises:
a signal intensity of a first communication signal received by the first wireless communication device from a second wireless communication device gradually increasing, and then the signal intensity of the first communication signal reaching a max signal intensity, and then the signal intensity of the first communication signal gradually decreasing.

13. The reminder method according to claim 11, further comprising:
determining whether the distance value is greater than the preset distance value after a second condition is meet, wherein the second condition comprises:
each of a predetermined number of continuously captured images matching a predetermined image template.

14. A reminder method that is applied to an electronic device, comprising:
obtaining, by a processor of the electronic device, weather information at a predetermined time point;
obtaining weather information of two different time points; and
transmitting, by the processor, a reminder according to a result of comparing the weather information at the two different time points, wherein the reminder includes a related object relevant to the obtained weather information.

15. The reminder method according to claim 14, further comprising:
transmitting the reminder when a distance value between the electronic device and the related object is greater than a preset distance value.

16. The reminder method according to claim 15, further comprising:
determining the distance value is greater than the preset distance value when a signal intensity of a communication signal is less than a preset signal intensity, wherein the communication signal is received by a first wireless communication device of the electronic device from a wireless communication device installed on the related object.

17. The reminder method according to claim 16, further comprising:
determining whether the distance value is greater than the preset distance value after a first condition is meet, wherein the first condition comprises:
a signal intensity of a first communication signal received by the first wireless communication device from a second wireless communication device gradually increasing, and then the signal intensity of the first communication signal reaching a max signal intensity, and then the signal intensity of the first communication signal gradually decreasing.

18. The reminder method according to claim 16, further comprising:
determining whether the distance value is greater than the preset distance value after a second condition is meet, wherein the second condition comprises:
each of a predetermined number of continuously captured images matching a predetermined image template.

* * * * *